July 22, 1952  E. M. SPLAINE  2,603,785
EYE PROTECTION DEVICE
Filed Dec. 21, 1946  2 SHEETS—SHEET 1
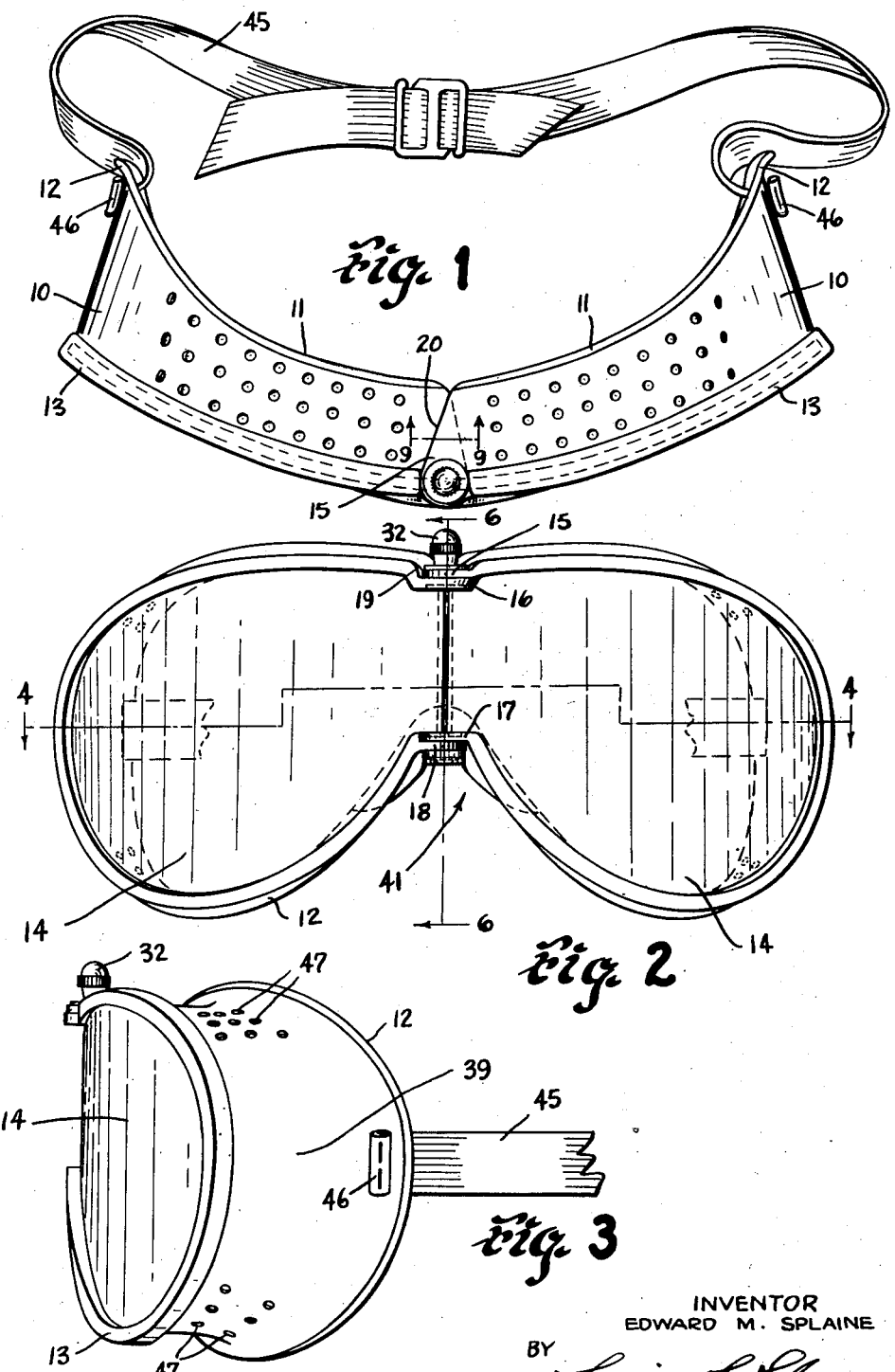
INVENTOR
EDWARD M. SPLAINE
BY
Louis L. Gagnon
ATTORNEY

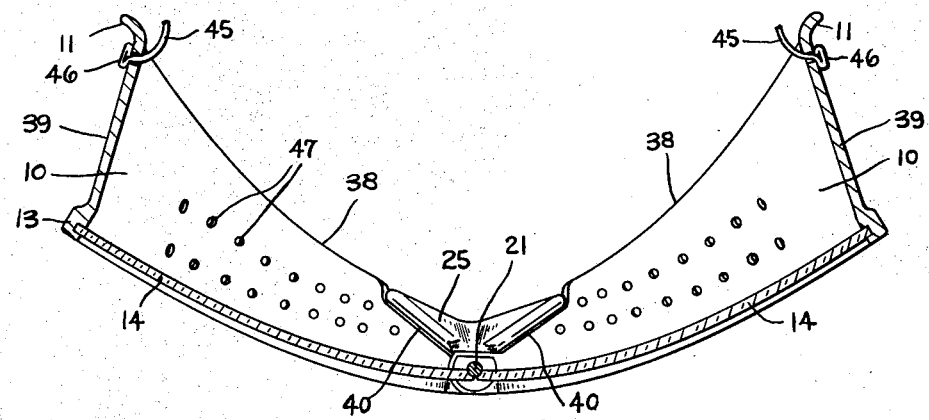
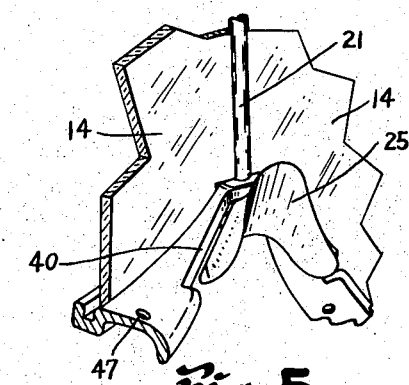
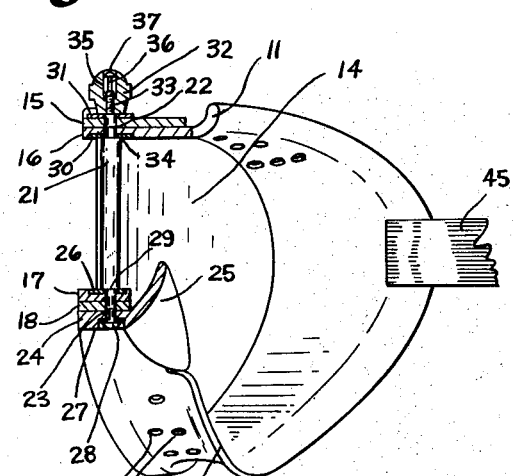
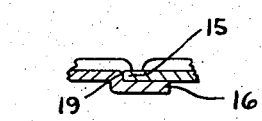
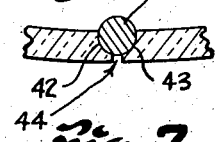
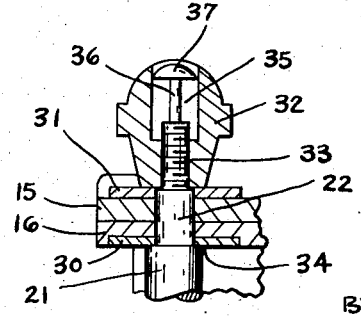

Patented July 22, 1952

2,603,785

UNITED STATES PATENT OFFICE 2,603,785

EYE PROTECTION DEVICE

Edward M. Splaine, Southbridge, Mass., assignor to American Optical Company, Southbridge, Mass., a voluntary association of Massachusetts Application December 21, 1946, Serial No. 717,642

4 Claims. (Cl. 2—14)

This invention relates to eye protection devices or goggles of the type adapted particularly to surround the contours of the eyes and relates more particularly to providing such goggles with portions adjustable to the general facial characteristics of different individuals and method of making the same.

One of the principal objects of the invention is to provide a single aperture type goggle embodying two eye cup portions and two shield-like lens portions adjustably related with each other and so controlled as to shape as to cause said lens portions to curve in the direction of the curvature of the face with the radius of curvature of said lens portions and the related thickness of the lens medium of said portions being so controlled as to avoid the introduction of an excessive amount of focal error, that is, to maintain the focal error which might be present when viewing objects through the lenses within negligible or tolerable limits.

Another important object of the invention is to provide a single aperture type eye protection device having two major cup portions pivotally connected with each other and adjustable to fit the general facial characteristics of different individuals.

Another object is to provide an eye protection device of the above character formed of relatively light weight non-metallic material having two major cup portions formed with face contacting edge portions shaped to the general contour of the face and having forwardly extending integrally related wall portions terminating in forwardly disposed lens receiving grooves having two major lens members, shaped substantially to the contour shape of the cup portions seated in the lens receiving grooves and having vertically disposed nasal edge portions arcuately grooved and fitted in relatively intimate relation with the pivot means joining the cup portions, with said nasal edges being spaced sufficiently to permit a controlled extent of pivotal movement with said arcuately grooved edges retaining their intimate relation with the pivot means and with the inner face contacting edges having integral outwardly flared portions.

Another object is to provide an eye protection device of the above nature having a nose bearing or guard member carried by the pivotal means and having its upper and lower forwardly extending walls provided with a plurality of ventilation perforations.

Another object is to provide an eye protection device of the above character with two major eye cup portions having superimposed flared lip portions on the nasal sides thereof with vertically disposed connection means extending through said aligned perforations and embodying means for frictionally retaining said eye cup portions in pivotal relation with each other, said means being capable of being loosened an amount sufficient to enable the insertion or removal of the lenses from said eye cup portions.

Another object is to provide an eye protection device of the above character having two separate pivotally connected eye cup portions so formed and related with each other as to in effect produce a single aperture type protection device surrounding the two eyes with a clearance for affording free ventilation transversely of the nose.

Another object is to provide an eye protection device of the above character whose eye cup portions are adjustable to compensate for different widths of heads or faces and which will assume a comfortable fit with the face.

Another object is to provide an eye protection device of the above character which may be worn over prescriptive mountings and lenses and which will afford protection means for said mountings and lenses as well as for the eyes of the individual.

Another object is to provide an eye protection device of the above character with a face contacting edge and nose bearing portion shaped to assume a comfortable fit with the face and to insure the individual against facial injury should the said device be subjected to sudden impact, particularly force exerted in a downward direction.

Another object is to provide an eye protection device of the above character which is simple in construction; inexpensive to manufacture and which is light in weight and comfortable in use and which will afford maximum protection.

Other objects and advantages of the invention will become apparent from the following description taken in connection with the accompanying drawings and it will be apparent that many changes may be made in the details of construction, arrangement of parts, and methods shown and described without departing from the spirit of the invention as expressed in the accompanying claims. The invention, therefore, is not limited to the exact details of construction, arrangement of parts and methods shown and described as the preferred form only is given by way of illustration.

Referring to the drawings:

Fig. 1 is a top plan view of the device embodying the invention;

Fig. 2 is a front elevational view of said device;

Fig. 3 is a side elevational view of said device;

Fig. 4 is a transverse sectional view of the said device taken as on line 4—4 of Fig. 2 and looking in the direction indicated by the arrows;

Fig. 5 is a fragmentary rear perspective view of the nasal or central portion of the device showing parts thereof in section;

Fig. 6 is a vertical sectional view taken as on line 6—6 of Fig. 2 and looking in the direction indicated by the arrows;

Fig. 7 is an enlarged fragmentary sectional view of the nasal edges of the lenses showing their association with the central vertical pivotal means;

Fig. 8 is an enlarged fragmentary sectional view of the pivotal clamp arrangement; and Fig. 9 is a slightly enlarged fragmentary sectional view taken as on line 9—9 of Fig. 1 and looking in the direction indicated by the arrows.

Single aperture goggles are not new in the art. There have been several different types of goggles of this nature introduced to the trade but in all known instances in the past such goggles embodied a single shield type lens and a single unitary cup type frame support for the lens which was of a relatively rigid non-adjustable nature requiring goggles to be formed to various sizes with a view to fitting the general facial characteristics of different individuals, that is, individuals having a relatively wide full face to individuals having a relatively narrow face.

With eye protection devices of this prior art type, the particular fit of the goggle had to be accepted and no adjustments were possible and in most instances resulted in a poor and uncomfortable fit with the face.

Single aperture type goggles of the character described have a decided advantage in that they the light in weight, resistant to impact and afford free ventilation transversely of the eyes and throughout the entire area of the interior of the eye cup or lens frame while affording a maximum field of vision. The present invention retains all of the advantages of the prior art devices of this nature while providing a single commercial structure which may be adjusted to meet the general facial requirements of different individuals and to assume a comfortable fit with the face.

In designing the device embodying the invention, one of the major difficulties encountered with some prior art devices of this nature was overcome, namely, that of controlling the curvature of the lenses and the related thickness of lens so as to avoid the introduction of intolerable focal errors.

Another difficulty overcome is that of having to form the goggle to various different sizes in order to fit the general facial characteristics of different individuals. This has been accomplished by forming the single aperture type device embodying the invention in two major sections pivotally connected centrally thereof so as to permit the temporal sides of the two sections to be moved toward and away from each other to meet the facial requirements of different individuals. This also enables the goggles to be fitted over corrective spectacles when worn by the individual. The face contacting edge is provided with an outwardly rolled portion to afford a comfortable engagement with the face and the device is further provided with a large area nose rest for aiding in avoiding injury to the nose of the individual should the device be subjected to suddent impact, particularly in a downward direction.

While overcoming the above major difficulties with a device of this nature, the said device is extremely light in weight, inexpensive to manufacture as well as providing a comfortable fit with maximum ventilation.

Referring more particularly to the drawings wherein like characters of reference designate like parts throughout the several views, the device embodying the invention comprises a pair of cup members 10 each having a face engaging edge portion 11 formed with an integral outwardly curling lip 12 for engaging the face of the wearer. The face contacting edge 11 is carefully controlled as to its shape so that it will fit the general facial characteristics of most individuals.

The main eye cup members are formed of non-metallic material, preferably transparent, plastic material such as cellulose acetate, cellulose nitrate, methyl methacrylate or other known artificial resins and in addition to having the integral face contacting edge portion 11 each have a forward integrally related grooved portion 13 adapted to receive the contour edge of the respective lenses 14.

The eye cup members have integrally related wall portions extending throughout the tops, sides and bottoms thereof with the nasal sides of said upper wall portions having overlapping integral tongues 15 and 16 and the nasal sides of the lower wall portions having overlapping integral tongues 17 and 18, see Figs. 1, 2, and 6. The tongue 15 extends outwardly substantially in the plane of the surface of the upper wall portion of its cup member while the tongue 16 is deflected inwardly to form an offset shouldered portion 19 against which the edge 20 of the tongue 15 is adapted to limit the inward pivotal movement of the cup members 10 relative to each other. The said tongues 15, 16, 17 and 18 are respectively provided with aligned openings through which a pivot pin 21, see Fig. 6, is adapted to extend. The pivot pin 21 has a reduced portion 22 extending through the openings in the tongues 15 and 16 and has a lower reduced portion 23 extending through the openings in the tongues 17 and 18 and through an opening in an integrally formed lip 24 carried by a nose rest or bearing member 25. The reduced projection 23 simultaneously extends through spaced washers 26 and 27, one engaging the upper surface of the tongue 17 and the other engaging the upper surface of the lip 24 and the exposed end of the reduced portion 23 is headed over as illustrated at 28 to secure the parts in pivotal position on the reduced portion 23, that is, between the enlarged head 28 and the shouldered portion 29 of the pin 21. The reduced projection 22 extends through a washer 30 overlying the undersurface of the tongue 16 and a washer 31 overlying the upper surface of the tongue 15 and is of a length slightly less than the combined thickness of the superimposed tongues and washers. This affords means whereby a suitable nut 32 threadedly connected to a further reduced threaded extension 33 carried by the reduced portion 22 may be adjusted into binding clamping relation with the washer 31 with the washer 30 engaging the upper shouldered end 34 of the pivot pin 21 and thereby binding the tongues 15 and 16 between said nut and shouldered end 34. This is best shown in Fig. 8. The nut 32 is provided with a central bore 35 of a diameter greater than the diameter of the threaded opening therein and into which a further reduced end 36 carried by the threaded portion 33 extends. This reduced portion 36 is provided with an enlarged head 37 and is of a length sufficient to permit the nut 32 to be backed off relative to the threaded portion 33 an amount sufficient to permit the upper and lower walls of the nasal sides of the eye cups to open in order to permit the insertion or removal of the lenses 14.

It is particularly pointed out that the width of the upper wall portions of the eye cups is greater than the width of the lower wall portions, particularly throughout the intermediate portion of the device whereby the lenses will tilt outwardly at the top and be inclined inwardly toward the bottom of the device. The edges 38 of the lower walls of the cup portions, while having an outwardly flared lip portion, are carefully controlled as to shape so as to fit the general contour of the cheeks or cheek bones of most individuals. The outer wall portions 39 of the eye cups are of a much greater width than the lower nasal portions of the cups so as to control the planes of the lenses with respect to straight ahead vision, that is, to keep them within a controlled limit as to the angle of the lenses relative to the lines of straight ahead vision.

The nasal sides of the lower wall portions, as shown best in Figs. 4 and 5, are recessed as illustrated at 40 to provide a clearance for a limited pivotal movement of the nose rest or bearing member 25. It is particularly pointed out that Fig. 4 shows the innermost adjusted portion of the eye cups relative to each other. The nose rest or bearing member is preferably formed of non-metallic material simulating the material of the cup portions and lenses.

The lenses are so designed that, when the eye cup portions 10 are adjusted to their innermost position relative to each other about the pivot pin 21, they will describe a substantially continuous arc, see Fig. 4. The axis of the pivot pin 21 lies substantially in the plane of the inner surfaces of the lenses.

In designing the device in general, particularly the lenses, great care is exercised that the lenses will afford adequate protection for general use while affording maximum field of vision and while avoiding the introduction of focal error of an amount which might be detrimental to the vision of the wearer.

To obtain the protection desired, it is necessary that the lenses be of sufficient thickness, to obtain the maximum field of vision desired, the contour shape of lens must be controlled and the lens must be provided with a curvature, particularly along the horizontal axis thereof.

While providing the adequate thickness and curvature of lens, said related thickness and curvature must be controlled so as to avoid the introduction of intolerable focal error.

The following chart is given as an illustration of the focal power error as introduced by different related thicknesses and curvatures in lenses:

| Thickness | Curvature | Power |
| --- | --- | --- |
| M./M. | Diopters | |
| 1.0 | 2 | −0.005 D |
| 1.0 | 3 | −0.012 D |
| 1.0 | 4 | −0.020 D |
| 1.0 | 5 | −0.032 D |
| 1.0 | 6 | −0.048 D |
| 1.0 | 7 | −0.064 D |
| 1.0 | 8 | −0.084 D |
| 1.5 | 2 | −0.0075 D |
| 1.5 | 3 | −0.018 D |
| 1.5 | 4 | −0.030 D |
| 1.5 | 5 | −0.048 D |
| 1.5 | 6 | −0.072 D |
| 1.5 | 7 | −0.096 D |
| 1.5 | 8 | −0.126 D |
| 2.0 | 2 | −0.010 D |
| 2.0 | 3 | −0.024 D |
| 2.0 | 4 | −0.040 D |
| 2.0 | 5 | −0.064 D |
| 2.0 | 6 | −0.096 D |
| 2.0 | 7 | −0.128 D |
| 2.0 | 8 | −0.168 D |
| 3.0 | 2 | −0.015 D |
| 3.0 | 3 | −0.036 D |
| 3.0 | 4 | −0.060 D |
| 3.0 | 5 | −0.096 D |
| 3.0 | 6 | −0.144 D |
| 3.0 | 7 | −0.192 D |
| 3.0 | 8 | −0.252 D |

In the 1 m./m. thickness group, the range of curvatures from 4 to 7 diopters gives the upper and lower limits of the focal error which would be tolerable. In this group, the 6 diopter curve combined with the 1 m./m. thickness would be the preferable combination but, for applicant's desired use, this lens would be too thin to afford the protection desired.

In the 1.5 m./m. thickness group, the range of curvatures from 3 to 6 diopters gives the upper and lower limits of the focal error which would be tolerable. In this group, the 5 diopter curve combined with the 1.5 m./m. thickness would be the preferable combination but again, for applicant's desired use, this lens would be too thin to afford the protection desired.

In the 2.0 m./m. thickness group, the range of curvatures from 2 to 4 diopters gives the upper and lower limits of the focal error which would be tolerable. In this group, the 4 diopter curve combined with the 2.0 m./m. thickness would be the preferable combination and is the one actually used by applicant as this curve provides adequate field of vision while the thickness affords the proper protection with the focal error being well within the range of tolerance of the eyes.

The above chart further gives the 3.0 m./m. thickness and associated curvatures and the focal error resulting from the use of said various curvatures with said thickness. In this 3.0 m./m. group, the 2 and 3 diopter curves would be useable, but it is quite apparent that the error would be much greater than that of the 4 diopter curve combined with the 2.0 m./m. thickness. Here again, the resultant lens would be flatter and would not give adequate peripheral vision.

From the above, it will be seen, therefore, that for different given uses the lenses could be formed within a thickness range of from 1.0 to 3.0 m./m. and that several lenses within each group and having the different given curvatures referred to above would be practical for different selected uses, but, for the particular present use, applicant prefers the 2.0 m./m. thickness combined with the 4 diopter curve for better all-around function and performance.

It is particularly pointed out that the lenses are of cylindrical type and that the central pivot means maintains the axes of the lenses in alignment with each other at different adjusted positions of the eye cups.

The respective eye cups are so controlled as to shape as to fit about the contours of the eyes with the upper surfaces of the wall portions lying substantially in flush relation with each other and, in effect, produce a continuous upper wall with the lower wall portions curving upwardly to the integrally related lip portions 17 and 18 to provide a nasal recess illustrated at 41 in Fig. 4 for clearance with the nose. The lenses are of substantially the same contour shape as the grooved lens supporting edge portion 13 and are adapted to fit snugly within said grooved portion when in position of use.

To facilitate the pivotal movement of the cup portions 10 relative to each other about the pivot pin 21, as shown best in Figs. 4 and 7, particularly Fig. 7, the respective lenses are each provided with a vertically disposed arcuate groove 42 and 43 adapted to fit relatively intimately with the adjacent side surfaces of the pin 21 and the said lenses are spaced relative to each other as illustrated at 44 to permit the full range of pivotal movement of said eye cups with respect to each other, the range of pivotal movement being of an amount sufficient to compensate for the full width of adjustment required and the innermost adjustment required. The temporal walls of the cup members are provided with a slot through which the headband or the like 45 is extended. The ends 46 of the headband are enlarged to secure the said headband in position relative to the eye cup.

The relatively intimate fit of the inner grooved nasal edges 42 and 43 with the pivot pin 21 aids in preventing the entrance of dust, dirt, etc. inwardly of the eye cup regardless of the angled relation of the cup members with respect to each other. The upper and lower walls of the eye cups are provided with a plurality of vent openings 47 to afford ventilation in a direction transversely of the lenses vertically of the goggle while the space between the inner face contacting edge of the eye cups and the lenses in the vicinity of the nose allows the ready passage of air transversely of the nose between the eye cups.

The nose rest or bearing member is so shaped as to have a relatively wide area of contact with the nose and affords protection should the device be subjected to sudden impact, particularly in a downward direction, with the outwardly curled lip further aiding in preventing injury to the face as well as affording a comfortable fit of the device with the faces of different individuals.

The distance between the face contacting edge 11 and the lenses is such as to enable the use of a corrective mounting by the wearer thereby producing a fit-over type goggle as well as a single aperture type goggle. The side walls 39, through the adjustment of the eye cups about the pivot pin 21, are positioned in overlying relation with the temples of the corrective mounting.

The enlarged end 37 prevents the full removal of the nut 32 so that the said nut cannot become displaced and accidentally lost.

When it is desired to interchange the lenses 14 which may be formed of glass or transparent plastic material as desired, all that is necessary is to loosen the nut 32 an amount sufficient to permit the upper walls of the eye cups to be spread relative to the lower walls whereby the lenses may be quickly and easily removed from or placed within the lens retaining groove in the portion 13. The lens retaining groove extends from adjacent the upper nasal sides of the eye cups, throughout the temporal sides and back to the lower nasal sides of the eye cups.

In forming the goggle, the eye cup portions may be injection molded to the shape desired or may be shaped from sheet material under the action of heat and compression between suitable forming dies. In instances when the lenses 14 are formed of plastic material they may be initially formed from relatively flat sheet stock bent to the controlled curvature required and of the controlled thickness required in order to control the focal errors and will be held to the curved shape desired by the shape of the forwardly grooved portion 13 which is curved in the direction of the contour of the face.

From the foregoing description, it will be seen that simple, efficient and economical means and method have been provided for accomplishing all of the objects and advantages of the invention.

Having described my invention, I claim:

1. An eye protection device of the character described comprising a pair of eyecups having a transparent shield mounted in the forward portion thereof, said eyecups each being divided in their nasal regions to have upper and lower end portions in spaced relation, the upper and lower end portions of one eyecup being connected with the respective upper and lower end portions of the other eyecup for pivotal movement of the eyecups about an axis substantially adjacent the plane in which said shields are mounted, the nasally disposed peripheral edge of said shields being grooved, and a spacer portion of cylindrical shape disposed intermediate the spaced ends of the eyecups and seated in said grooved edges of the shields to obtain a substantially intimate seal between the nasal edges of the shields during pivotal movement of the eyecups.

2. An eye protection device of the character described comprising a pair of eyecups each having a rearwardly disposed face engaging portion and a transparent shield mounted in the forward portion thereof, said eyecups being divided in their nasal regions to have upper and lower end portions in spaced relation, the upper and lower end portions of one eyecup being connected with the respective upper and lower end portions of the other eyecup for pivotal movement of the eyecup about an axis lying substantially in the plane of the rear surface of said shields, the shields each having their nasally disposed peripheral edges meeting adjacent said axis, and with said nasally disposed edges being grooved along their length to an arcuate shape in section, and a spacer portion of cylindrical shape disposed intermediate the spaced ends of the eyecups and seated in said grooved edges of the shields to obtain a substantially intimate seal between said nasal edges of the shields during pivotal movement of the eyecups.

3. An eye protection device of the character described comprising a pair of eyecups each having a transparent shield mounted in the forward portion thereof, said eyecups being divided in their nasal regions to have upper and lower end portions in spaced relation with the upper and lower end portions of one eyecup being disposed in overlapping relation with the respective upper and lower end portions of the other eyecup, said end portions having aligned openings therein, and a cylindrically shaped pivot member disposed intermediate said spaced end portions and having its end portions extended through said openings and terminating in cap-like restricting portions, said aligned openings being disposed to have the pivot member lie substantially in the plane in which the shields are mounted, the adjacent edges of the shields being grooved to obtain a substantially intimate encircling seat with the pivot member, and a control member carried by one end of said pivot member intermediate the cap-like portion thereof and the adjacent end portion of an eyecup, said control member being mounted thereon for adjustment toward and away from said end portion so as to permit a varying of the separation between said spaced end portions of the eyecups.

4. An eye protection device of the character described comprising a pair of eyecups each having a transparent shield mounted in the forward portion thereof, said eyecups being divided in their nasal regions to have upper and lower ends in spaced relation, said upper and lower ends of each eyecup having a hinge portion disposed in overlapping relation with the hinge portion of the respective adjacent end of the other eyecup, a spacer portion of cylindrical shape disposed intermediate the spaced pairs of overlapping hinge portions, and means adjacent the opposed ends of said spacer portions connecting said overlapping hinge portions for pivotal movement of the eyecups about an axis located adjacent the plane in which the shields are mounted, the nasally disposed peripheral edge of said shields being shaped to substantially fit with the adjacent surface of the spacer portion during pivotal movement of the eyecups, and nose engageable means adjacent the lower pair of pivotally connected hinge portions.

EDWARD M. SPLAINE.

REFERENCES CITED

The following references are of record in the file of this patent:

UNITED STATES PATENTS

| Number | Name | Date |
|---|---|---|
| 1,145,711 | Stevens | July 6, 1915 |
| 1,609,477 | King | Dec. 7, 1926 |
| 1,769,606 | Queen | July 1, 1930 |
| 2,129,521 | Aspenleiter | Sept. 6, 1938 |
| 2,248,864 | Greiner | July 8, 1941 |
| 2,271,703 | McNeill | Feb. 3, 1942 |
| 2,391,349 | Ring | Dec. 18, 1945 |

FOREIGN PATENTS

| Number | Country | Date |
|---|---|---|
| 264,280 | Great Britain | Jan. 20, 1927 |
| 359,601 | France | Mar. 21, 1906 |
| 835,410 | France | Sept. 19, 1938 |